United States Patent [19]
Gelfand et al.

[11] Patent Number: 6,144,697
[45] Date of Patent: Nov. 7, 2000

[54] EQUALIZATION TECHNIQUES TO REDUCE INTERSYMBOL INTERFERENCE

[75] Inventors: Saul B. Gelfand, Lafayette; Ian J. Fevrier, West Lafayett, both of Ind.; Michael P. Fitz, Worthington, Ohio

[73] Assignee: Purdue Research Foundation, West Lafayette, Ind.

[21] Appl. No.: 09/055,682

[22] Filed: Apr. 6, 1998

Related U.S. Application Data

[60] Provisional application No. 60/073,427, Feb. 2, 1998.

[51] Int. Cl.[7] ................... H04B 1/10; H04L 25/08
[52] U.S. Cl. ............................. 375/233; 375/348
[58] Field of Search ..................... 375/233, 346, 375/348, 232, 234

[56] References Cited

U.S. PATENT DOCUMENTS

| | | |
|---|---|---|
| 3,875,515 | 4/1975 | Stuart et al. . |
| 3,974,449 | 8/1976 | Falconer . |
| 3,984,789 | 10/1976 | Luvison et al. . |
| 4,468,786 | 8/1984 | Davis . |
| 5,119,401 | 6/1992 | Tsujimoto ................. 375/233 |
| 5,157,690 | 10/1992 | Buttle . |
| 5,283,811 | 2/1994 | Chennakeshu et al. . |
| 5,297,166 | 3/1994 | Batruni . |
| 5,327,460 | 7/1994 | Batruni ..................... 375/233 |
| 5,345,476 | 9/1994 | Tsujimoto ................. 375/233 |
| 5,402,445 | 3/1995 | Matsuura . |
| 5,481,564 | 1/1996 | Kakuishi et al. ............ 375/230 |
| 5,500,892 | 3/1996 | Essig ....................... 379/345 |
| 5,513,214 | 4/1996 | Gozzo . |
| 5,524,125 | 6/1996 | Tsujimoto ................. 375/347 |
| 5,675,612 | 10/1997 | Solve et al. ............... 375/326 |
| 5,694,437 | 12/1997 | Yang et al. ................ 375/346 |
| 5,703,904 | 12/1997 | Langberg .................. 375/232 |
| 5,732,112 | 3/1998 | Langberg .................. 375/349 |
| 5,742,642 | 4/1998 | Fertner .................... 375/233 |
| 5,784,415 | 7/1998 | Chevillat et al. .......... 375/341 |
| 5,835,526 | 11/1998 | Juntti . |
| 5,886,748 | 3/1999 | Lee ........................ 348/614 |

*Primary Examiner*—Young T. Tse
*Attorney, Agent, or Firm*—Woodard, Emhardt, Naughton, Moriarty & McNett

[57] ABSTRACT

Equalization techniques are disclosed to reduce intersymbol interference of a received signal. Intersymbol interference is reduced by feedforward filtering and adjusting the input to the feedforward filter with feedback. This approach facilitates the removal of intersymbol interference from sparse signal portions before sparseness is undermined by other equalization procedures. Also, multiplication operations may be reduced and limited multiplier resources more effectively allocated by applying a threshold test to various multiplier coefficients associated with the equalization technique.

37 Claims, 8 Drawing Sheets

EQUALIZATION TECHNIQUES TO REDUCE INTERSYMBOL INTERFERENCE

This application claims benefit of Provisional application Ser. No. 60/073,427 filed Feb. 2, 1998.

The present invention relates to communication systems, and more particularly, but not exclusively, relates to the removal of intersymbol interference in a communication signal.

Today's communication systems often rely on the rapid transmission of successive signals to represent a selected sequence of information-bearing symbols. Unfortunately, the channel over which these signals are transmitted often suffers from distortion that tends to cause the signals to spread-out and overlap one another with respect to time, resulting in intersymbol interference. Typically, intersymbol interference manifests itself as secondary signal components that hamper the detection of the primary, information-bearing signal components. In one model, the nonideal channel may be characterized as having a number of signal paths of different lengths coupling a common transmitter and receiver. For this characterization, the secondary signal components resulting from intersymbol interference may be thought of as "echoes" of the signals that occur during transmission over the multiple propagation paths.

To counteract unwanted signal components caused by intersymbol interference, an equalizer is sometimes utilized. Equalizers typically cancel the secondary signal components or constructively combine the secondary signal components with the primary signal components to improve reconstruction of the intended symbols. U.S. Pat. No. 3,974,449 to Falconer; U.S. Pat. No. 4,468,786 to Davis; U.S. Pat. No. 5,297,166 to Batruni; and U.S. Pat. No. 5,402,445 to Matsuura provide a few representative examples of such equalizers. One factor commonly impacting the complexity of such equalizers is the number of required multiplication operations. For example, equalization schemes often entail multiplying a large number of discrete values representative of the signal by different coefficients. When the values and coefficients are complex, having both real and imaginary components, the number of multiplication operations typically increases to provide the corresponding complex product. Moreover, the number of required multiplications needed to provide adequate equalization generally increases with the rate of transmission and the amount the signal is spread-out over time by the channel. This trend corresponds to an increased number of echoes and a longer time interval between the arrival of the earliest and latest secondary signal components.

In order to process high speed data signals with long spreads in realtime, a large number of hardware multipliers are often utilized to simultaneously perform as many of the required multiplications as possible. Hardware multipliers—especially complex multipliers—are among the most complicated and space intensive devices commonly used in dedicated equalizer circuitry. As a result, exceedingly complex equalizers may be envisioned to handle this type of signal, imposing significant hardware costs. High Definition Television (HDTV), ultra high-speed terrestrial communications, underwater acoustic channel communications, and cable television distribution are among those applications which are likely to include this signal type. Consequently, there is a demand for an equalizer of reduced complexity that preferably requires fewer hardware multipliers.

Moreover, it has been discovered that, while these signal types become spread-out over a significant period of time, detectable signal components occupy only a relatively small portion of the corresponding time interval. Unfortunately, existing intersymbol interference removal techniques often fail to utilize the sparse content of the signal. Indeed, some existing equalization schemes tend to initially add components to the input signal, significantly reducing sparseness. Thus, there is also a need for an equalizer that takes advantage of the sparse nature of a signal before sparseness is diminished.

The present invention satisfies these needs and provides other significant benefits and advantages.

SUMMARY OF THE INVENTION

The present invention relates to communication systems. Various aspects of the invention are novel, nonobvious, and provide various advantages. While the actual nature of the invention covered herein may only be determined with reference to the claims appended hereto, certain features which are characteristic of the preferred embodiments disclosed herein are described briefly as follows.

One feature of the present invention is an equalization technique to reduce intersymbol interference. For this technique, intersymbol interference may be reduced by feedforward filtering and adjusting the input to the feedforward filter with decision symbol based feedback. This approach facilitates the removal of intersymbol interference from sparse signal portions before sparseness is potentially diminished by other equalization procedures. Also, multiplication operations may be reduced and limited multiplier resources may be more effectively allocated by requiring equalizer coefficients to pass a threshold test before being provided as a multiplicand.

Another feature of the present invention includes successively shifting a data stream corresponding to a signal with intersymbol interference through a feedforward filter to reduce at least a precursor portion of the intersymbol interference. A stream of decision symbols corresponding to the signal is successively shifted through a first delay line that has a first number of delay elements and a first plurality of taps. Data entering the feedforward filter is adjusted with a sum of the first taps to reduce a postcursor portion of the intersymbol interference.

In an additional feature, the stream of decision symbols is sent through a second delay line having a second number of delay elements and a second plurality of taps. The second taps are combined with a number of feedforward taps from the feedforward filter to present a data sequence to a decision operator. The decision operator correspondingly provides the stream of decision symbols from the sequence in accordance with a predetermined symbol set.

In a further feature, the feedforward filter includes a delay line with a number of feedforward taps, a second number of delay elements each corresponding to one of the feedforward taps, and a plurality of input multipliers. The input multipliers each provide a product of one of the decision symbols and a corresponding one of the second coefficients. Each of the products is fed back at selected points along the delay line to reduce postcursor intersymbol interference. Data from the feedforward filter may be sliced to provide the stream of decision symbols.

An apparatus of another feature for processing a data signal with intersymbol interference includes a first summing junction, a feedforward filter, a decision operator, and a first feedback delay line. The first summing junction provides a first reduction of the intersymbol interference by adjusting the data signal with a feedback signal. The feedforward filter responds to the data signal after the first reduction to provide a second reduction of the intersymbol interference. The decision operator responds to the data signal after the first and second reductions to provide a corresponding stream of symbols which are each selected from a predetermined symbol set. The first feedback delay line has a first number of delays elements and a first plurality of weighted taps. The first feedback delay line responds to the stream of symbols to successively shift each of the symbols through the first delay elements and provide the feedback signal to the summing junction as a function of the first weighted taps.

Still another feature of the present invention includes: determining a first set of coefficients for an equalizer receiving a signal with intersymbol interference, comparing each of the first coefficients to a second set of coefficients, and equalizing the signal with the equalizer as a function of the second coefficients to reduce the intersymbol interference. The second coefficients are a subset of the first coefficients selected to minimize multiplication operations for this equalization. The second coefficients may be updated periodically to account for changes in the response of a channel causing the intersymbol interference.

In an additional feature, this equalizer includes hardware defining a number of delay elements and a number of multipliers. The multipliers may be fewer in number than the delay elements. The multipliers are each allocated to a selected one of the delay elements in accordance with the second coefficients to optimize the equalization for sparseness of a postcursor portion of the intersymbol interference. This allocation may be performed with a switching unit included in the hardware to selectively connect the multipliers to different delay elements. Preferably, the first and second coefficients are determined with a processor which is operatively coupled to the hardware to provide the second coefficients to the multipliers and corresponding control signals to the switching unit.

In yet another feature, an apparatus for reducing intersymbol interference of a signal includes a first filter, a decision operator, and a feedback means. The first filter includes a first number of delay elements each having a corresponding one of a first number of weighted taps. The first filter reduces intersymbol interference when the signal is fed therethrough. The decision operator provides a number of decision symbols from a predetermined symbol alphabet corresponding to a data stream from the first filter. The feedback means further reduces the intersymbol interference with a number of feedback coefficients. The feedback coefficients are each selected as a subset of a number of tentative coefficients by comparing each of the tentative coefficients to a predetermined threshold. At least one input to the first delay elements of the first filter is determined as a function of the feedback coefficients.

Accordingly, one object of the present invention is the reduction of intersymbol interference.

A further object is to reduce intersymbol interference by utilizing signal sparseness.

Another object of the present invention is to reduce complexity of equalization by taking advantage of sparseness in a postcursor portion of a signal.

An additional object is to reduce the number of multiplications required to perform equalization by applying a threshold test to corresponding coefficients.

Still another object is to direct allocation of hardware multiplier resources for an equalizer in accordance with threshold tested multiplier coefficients.

Further objects, features, and advantages of the present invention shall become apparent from the description and drawings provided herein.

DESCRIPTION OF PREFERRED EMBODIMENTS

Figure 1:
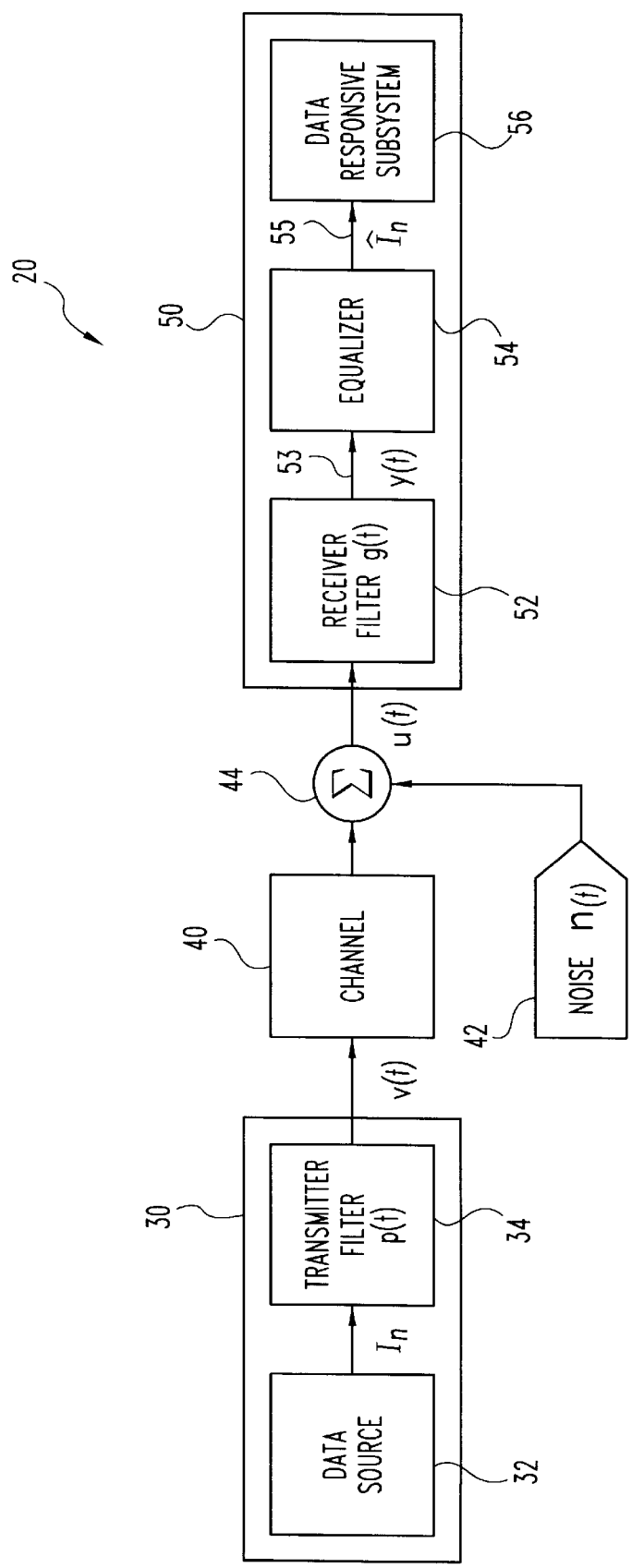
FIG. 1 is a schematic view of a communication system of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described techniques, methods, systems, or devices, and any further applications of the principles of the invention as described herein are contemplated as would normally occur to one skilled in the art to which the invention relates.

FIG. 1 depicts communication system 20 of one embodiment of the present invention. System 20 includes transmitter 30, communication channel 40, and receiver 50. Transmitter 30 has a data source 32 operatively coupled to a transmitter output filter 34. As used herein, an argument enclosed in braces ("{}") refers to a sequence or stream of discrete values, such as signal samples or symbols. If the argument has a variable subscript, this subscript operates as an index to individual members of the sequence or stream unless indicated otherwise. Also, when the argument is not enclosed, it refers generally to an individual member of the sequence or stream. Using this notation, data source 32 provides a discrete-valued symbol stream $\{I_n\}$ to filter 34 for transmission. Each member $I_n$ of stream $\{I_n\}$ is selected from a symbol set of M different symbols (an "M-ary" symbol alphabet or constellation). The symbols $I_n$ are provided at a rate of 1/T; where T is the time interval between successive symbols $I_n$ of stream $\{I_n\}$.

Data source 32 may correspond to an HDTV broadcast, a cable TV distribution system, or such other communication data source as would occur to those skilled in the art. Preferably, filter 34 is a square-root raised cosine filter with response p(t); however, filter 34 may be of any type as would occur to those skilled in the art. For the preferred filter 34 response p(t), filter 34 outputs a transmission v(t) corresponding to the data sequence $\{I_n\}$ that may be expressed by equation (1) as follows:

$$v(t) = \sum_n I_n p(t - nT); \quad (1)$$

where the subscript variable "n" indexes the summation terms, including each symbol $I_n$.

During transmission over channel 40, noise n(t), as represented by reference numeral 42, is added to the data signal transmitted along channel 40. This addition is schematically represented by adder 44. The output of adder 44 is designated transmitted signal u(t). Signal u(t) is input into receiver 50. Receiver 50 has hardware or programming suitable to process signal u(t), including synchronization or sampling operations appropriate for the particular format of u(t) as needed. For example, for a terrestrial broadcast mode of HDTV, a synchronization sequence is typically available which may be utilized by receiver 50 to provide appropriate timing of various related processes.

Receiver 50 also includes receiver input filter 52 having a response g(t) which is preferably matched to filter 34 to yield no intersymbol interference (ISI) for an ideally performing channel 40 at predetermined sampling instants. Unfortunately, channel 40 may perform in a nonideal manner, introducing amplitude and delay distortion that results in intersymbol interference. The impulse response of this nonideal channel in terms of multiple propagation paths may be expressed by equation (2) as follows:

$$x(t) = \sum_i \alpha_i \delta(t - \tau_i) e^{-j\theta_i}; \quad (2)$$

where $\alpha_i$, $\tau_i$, and $\theta_i$ represent the attenuation, delay, and phase of the ith propagation path, respectively and $\delta(t)$ is a unit impulse. By matching the response of filter 52, g(t), to the response of filter 34, p(t), the output of filter 52 provided on signal path 53 may be expressed by equation (3) as follows:

$$y(t) = \sum_n I_n c(t - nT) + n(t); \quad (3)$$

where c(t) is the equivalent baseband response of p(t)*x(t)*g(t) (multipath channel, transmitter filter 34, and receiver filter 52), $\{I_n\}$ are independent M-ary complex symbols, as previously introduced, that are generated at a rate of 1/T seconds, and n(t) is a sample function of a complex, zero mean, bandlimited Gaussian process with variance $N_o/2$ per dimension. The signal provided by filter 52, y(t), may be modeled as the output of a $T/\lambda$ spaced nonminimum phase Finite Impulse Response (FIR) filter. The response of this FIR filter is designated by $c_n$, with $\{c_n: 0 \leq n \leq \lambda L\}$; where L is the channel response length and $\lambda \geq 1$ is selected to determine the processing rate of the FIR filter relative to the symbol rate 1/T. With $\lambda$ set to 1 ($\lambda=1$), $T/\lambda=T/1=T$, resulting in a symbol-spaced FIR filter model which may be expressed by equation (4) as follows:

$$y_k = \sum_{n=0}^{L} (c_n I_{(k-n)}) + n_k; \quad (4)$$

where k and n are discrete value indices such that $y_k=y(kT)$, $c_n=c(nT)$, and $n_k=n(kT)$.

Figure 8:
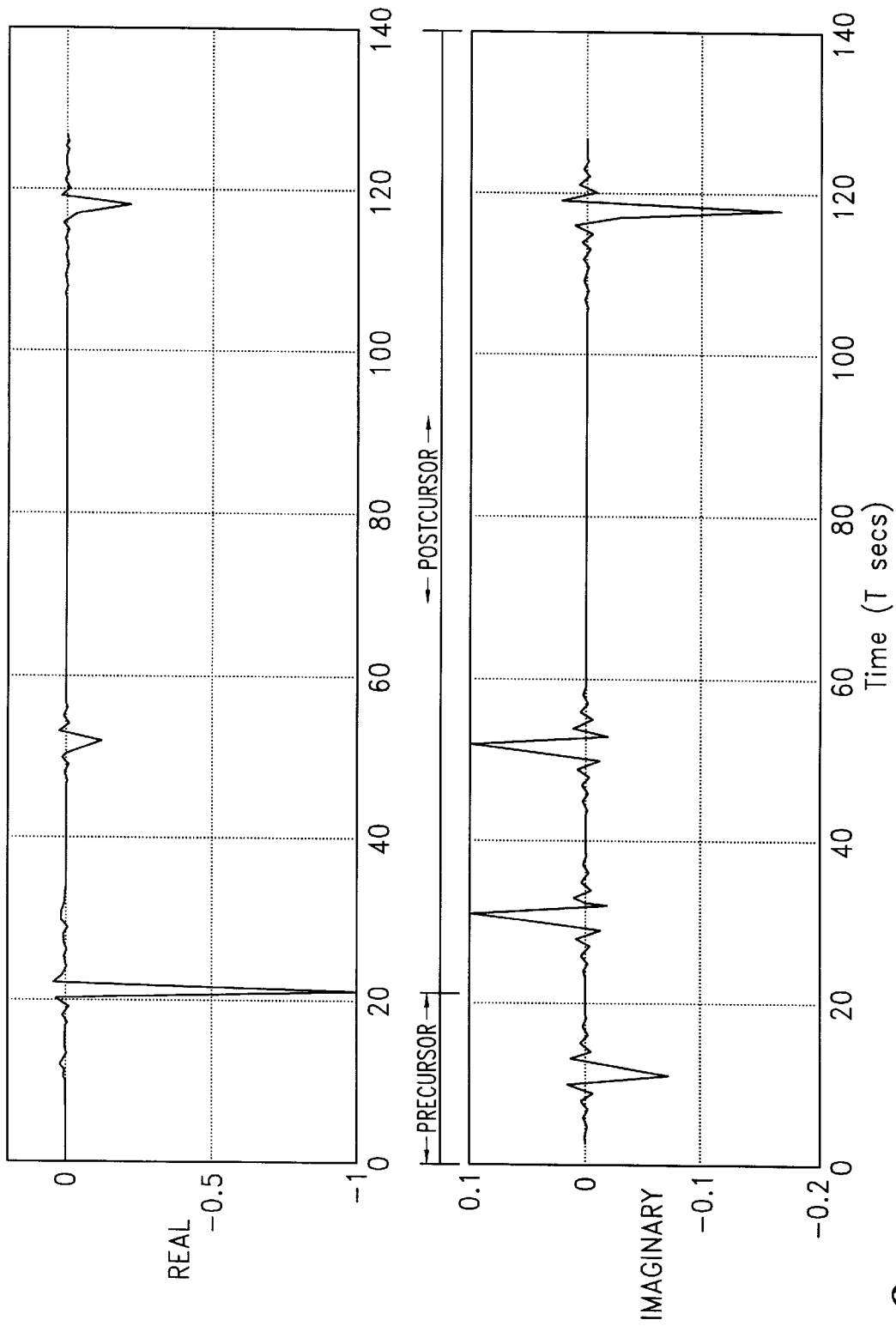
FIG. 8 is a diagram illustrating an example of sparse real and imaginary components of an HDTV terrestrial broadcast signal with intersymbol interference.

The discrete values $\{c_n\}$ of the FIR filter channel response model may be partitioned into precursor and postcursor responses, that precede and follow, respectively, the channel's peak response. For high-speed wireless channels, it often occurs that the precursor response is strong and the postcursor response is long and sparse. FIG. 8 provides one example of this type of response for an HDTV terrestrial broadcast which uses interleaved coded 8-VSB (vestigial sideband) modulation. The length L of $\{c_n\}$ in terms of discrete time periods may be partitioned into a precursor response of length $L_{pr}$ and a postcursor response of length $L_{po}$, respectively; where $L=L_{pr}+L_{po}$. Notably, it has been found that for HDTV terrestrial broadcast channels, typically $L_{pr} \ll L_{po}$, the postcursor response is typically sparse and L commonly corresponds to more than 100 discrete time periods.

To reduce, or preferably eliminate intersymbol interference, the output of filter 52, $\{y_k\}$, is input into equalizer 54 along path 53. After removing intersymbol interference, equalizer 54 provides the equalized data $\{\tilde{I}_k\}$ along path 55 to data response subsystem 56. Subsystem 56 may be any type of data subsystem as would occur to one skilled in the art. In one example, receiver 50 is for an HDTV system and subsystem 56 includes a suitable decoder operatively coupled to audio and video processing hardware that is responsive to the decoded data to provide corresponding audio and visual outputs.

Figure 2:
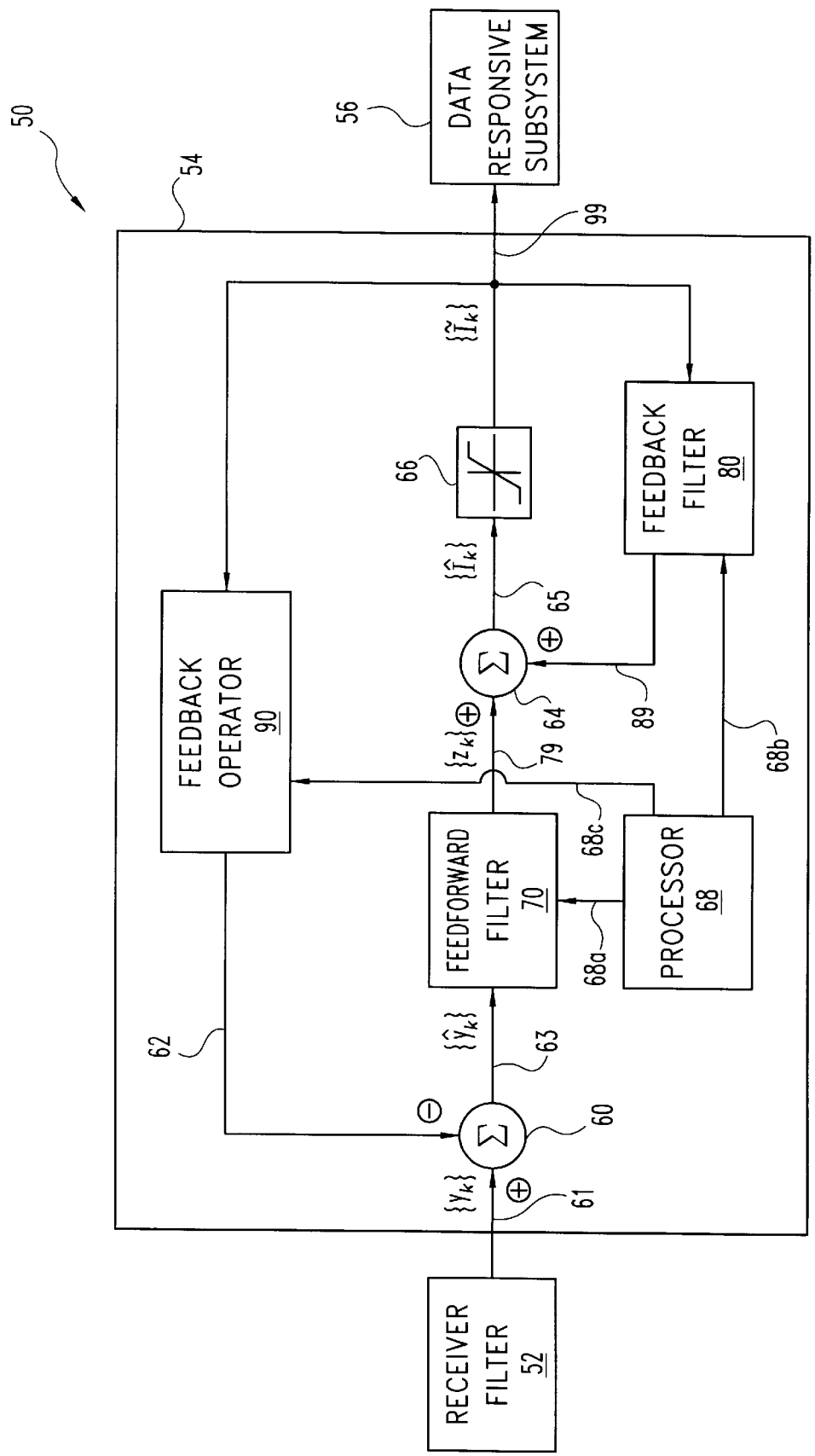
FIG. 2 is a schematic view showing selected aspects of the receiver of the system of FIG. 1 in greater detail.

Referring to FIG. 2, selected aspects of receiver 50 are further described. Filter 52 provides data stream $\{y_k\}$ to equalizer 54. Equalizer 54 has adder 60 summing data stream $\{y_k\}$ provided along input signal path 61 with a feedback signal provided along input signal path 62. As reflected by the negative "−" and positive "+" signs accompanying adder 60, the data provided along path 62 is subtracted from data stream $\{y_k\}$. The output of adder 60, designated $\{\hat{y}_k\}$, is provided on signal path 63. Signal path 63 provides an input to feedforward filter 70. Feedforward filter 70 reduces at least the precursor portion of the channel response to provide filtered signal $\{z_k\}$ on signal path 79. The filtered signal data $\{z_k\}$ is summed with feedback provided along signal path 89 by adder 64. The feedback data along path 89 is provided by feedback filter 80. Adder 64 provides a feedback adjusted data sequence $\{\hat{I}_k\}$.

Data sequence $\{\hat{I}_k\}$ is input to decision operator 66. For each symbol interval T, decision operator 66 determines which member of a predetermined symbol alphabet most closely corresponds to an input $\hat{I}_k$ value based on a predetermined selection standard or criteria. The resulting decision symbol $\tilde{I}_k$ is then output by decision operator 66 on signal path 99. Preferably, this symbol alphabet is the same M-ary symbol alphabet used to create $\{I_n\}$. Decision operator 66 outputs a stream of decision symbols $\{\tilde{I}_k\}$ corresponding to the data stream $\{y_k\}$ to preferably replicate the symbols $\{I_n\}$. Decision operator 66 may be of any conventional type and refers broadly to any arrangement of one or more slicers, quantizers, limiters, comparators, or such other arrangement of hardware or software as would occur to one skilled in the art to provide the desired operational capability.

Figure 3:
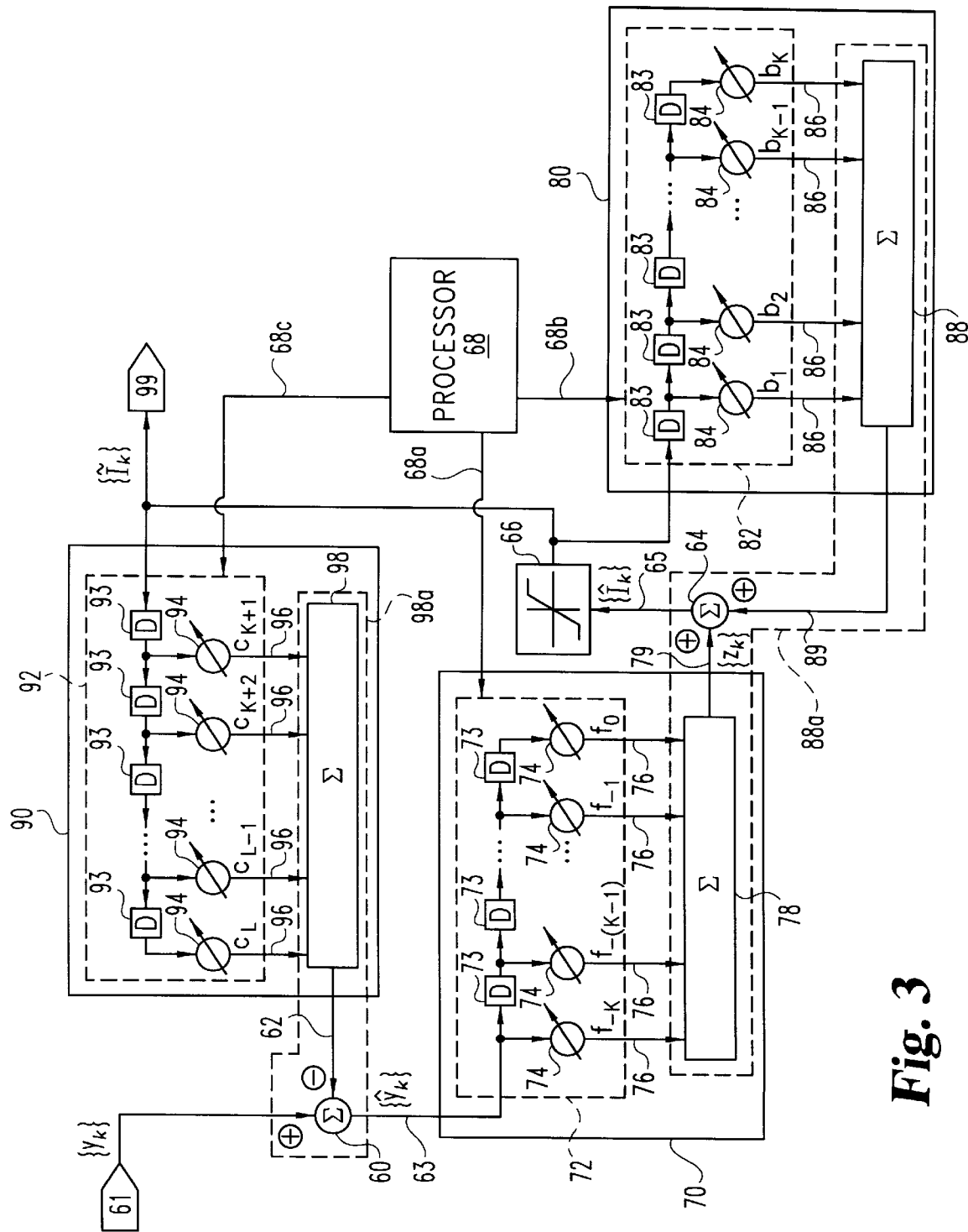
FIG. 3 is a schematic view showing selected aspects of the equalizer of FIGS. 1 and 2 in greater detail.

Symbol stream $\{\tilde{I}_k\}$ is provided as an output along signal path 99 to subsystem 56 and also is input into feedback filter 80 and feedback operator 90. Referring additionally to FIG. 3, further aspects of equalizer 54 are depicted. Data stream $\{y_k\}$ is adjusted by feedback from feedback operator 90 via adder 60 to provide adjusted data stream $\{\hat{y}_k\}$. Data stream $\{\hat{y}_k\}$ is input into feedforward filter 70 to remove at least a precursor portion of the intersymbol interference resulting from the nonideal channel response. Feedforward filter 70 includes delay line 72 comprised of a number of delay elements 73 each schematically represented by a "D" label. Delay elements 73 are coupled in series to provide for the successive shifting of data contents from one to the next in a manner known to those skilled in the art. For λ=1, data stream $\{\hat{y}_k\}$ is clocked through delay line 72 at the symbol rate such that the delay interval for each element 73 is generally equivalent to the symbol duration, T. In other words, delay line 72 is symbol-spaced.

Each delay element 73 is tapped and weighted by a corresponding multiplier 74 to provide corresponding weighted taps 76. Multipliers 74 are preferably of the complex type to accommodate a wide range of $\hat{y}_k$ formats. Taps 76 are each weighted by one of a set of feedforward tap coefficients. The desired length of delay line 72 in terms of the number of serially connected groups of delay elements 73, multipliers 74, and corresponding taps 76; typically varies in accordance with the channel response length L, the desired performance level of equalizer 54, or such other factors as would occur to one skilled in the art. To represent this variation, ellipses in feedforward filter 70 have been used to indicate the option of additional serially connected groups of delay elements 73, multipliers 74, and taps 76 arranged like those shown in FIG. 3.

For a given range of delay elements 73 of delay line 72 designated by the integer sequence —K, -K+1, . . . ,0; the feedforward tap coefficients used to weight taps 76 are correspondingly designated by $f_{-(K)}, f_{-(K-1)}, f_{-(K-2)}, \ldots, f_{-1}$, and $f_0$ (collectively designated coefficient set F). Coefficient set F is determined by processor 68 and provided along input signal path 68a.

Adder 78 has a number of inputs each receiving a corresponding tap 76 to output a sum $z_k$ on signal path 79. With each shift of delay line 72, the taps 76 input to adder 78 are subject to change which may result in a change in the sum output by adder 78. Consequently, adder 78, and correspondingly feedforward filter 70, output data stream $\{z_k\}$ at the symbol rate for λ=1. Data stream $\{z_k\}$ is input to adder 64 and adjusted with feedback from feedback filter 80 along signal path 89 to provide corresponding data sequence $\{\hat{I}_k\}$. Data sequence $\{\hat{I}_k\}$ is input to decision operator 66 to output the corresponding stream of decision symbols $\{\tilde{I}_k\}$ on signal path 99. Decision symbols $\{\tilde{I}_k\}$ are output to subsystem 56 and fed back through feedback filter 80 and feedback operator 90.

Feedback filter 80 successively shifts each decision symbol $\{\tilde{I}_k\}$ through delay line 82 at the symbol rate 1/T for λ=1 as described in connection with delay line 72. Delay line 82 has a number of serially connected delay elements 83 schematically represented by a "D" label. Each delay element 83 is tapped and weighted by a multiplier 84 to correspondingly provide weighted taps 86. The ellipses of delay line 82 represent groups of delay elements 83, multipliers 84, and corresponding taps 86 which may be optionally present, but are not shown to enhance clarity.

Preferably, multipliers 84 are of the complex type to accommodate complex signal types. Multipliers 84 are each weighted by a corresponding coefficient determined by processor 68 and provided along signal path 68b. In one preferred arrangement, the taps are indexed by an integer range from 1 through K; where K is the same value, but with opposite sign, as employed in the —K through 0 index range discussed in connection with feedforward filter 70. Correspondingly, the coefficients for taps 86 of feedback filter 80 may be designated $b_1, b_2, \ldots, b_{(K-1)}$, and $b_K$ (collectively designated coefficient set B). In other embodiments, a different number of taps 86 in relation to taps 76 may be utilized as would occur to those skilled in the art. Taps 86 are provided to respective inputs of adder 88 for summation to provide a corresponding feedback data stream to adder 64 to reduce postcursor intersymbol interference.

The symbol stream $\{\tilde{I}_k\}$ is also input into feedback operator 90. Feedback operator 90 includes delay line 92 with serially coupled delay elements 93 each schematically represented by a "D" label. Delay elements 93 are each tapped and weighted by a multiplier 94 to provide a corresponding weighted tap 96. Multipliers 94 receive weighting coefficients from processor 68 along path 68c. Preferably multipliers 94 are of the complex type to accommodate complex signal types. Delay line 92 successively shifts symbols $\tilde{I}_k$ through delay elements 93 at a symbol-spaced rate for λ=1. The ellipses of delay line 92 represent groups of delay elements 93, multipliers 94, and corresponding taps 96 which may be optionally present, but are not shown to enhance clarity.

For the ranges of —K through 0 for feedforward filter 70, and 1 through K for filter 80, the preferred range for feedback operator 90 is (K+1) through L; where L is the channel response length. Correspondingly, coefficients for multipliers 94 may be designated $c_{(K+1)}, c_{(K+2)}, \ldots c_{(L-1)}$, and $c_L$ (collectively designated as coefficient set C). Notably coefficient set C is at least a subset of $\{c_n\}$ of the FIR filter channel response model. Taps 96 are each input into adder 98 for summation. Adder 98, and correspondingly feedback operator 90, output a feedback stream of tap 96 summations at the symbol rate. This feedback is subtracted from $\{y_k\}$ through the summation performed with adder 60 to provide data stream $\{\hat{y}_k\}$ to feedforward filter 70. Instead of subtracting with adder 60, the arithmetic sign of the feedback from operator 90 may be reversed by adder 98 or by reversing the sign of coefficients $c_n$.

Notably, adders 64, 78, and 88 provide a common summing junction 88a represented by a single operator in phantom. For junction 88a, taps 76 and 86 are inputs and signal path 65 is the output. Also, adders 60 and 98 provide a common summing junction 98a represented by a single operator in phantom. For junction 98a, a signal input is provided by path 61 and other inputs are provided by taps 96, with path 63 providing the output. Also, junction 98a includes an arithmetic sign changing capability for the tap 96 inputs relative to input 61; however, the arithmetic sign of taps 96 may be reversed before addition by summing junction 98a in the alternative. Accordingly, it should be appreciated that junctions 88a, and 98a may be implemented by one or more components, through programming, or a combination of these techniques as would occur to one skilled in the art.

Next, the operation of equalizer 54 is further described. The output of adder 60, $\{\hat{y}_k\}$, may be expressed by equation (5) as follows:

$$\hat{y}_k = y_k - \left[\sum_{n=L_0}^{L} c_n \tilde{I}_{k-n}\right]; \quad (5)$$

where n is an index variable, $L_o$ is a selectable parameter, and $c_n$ is a member of coefficients C indexed by n. The data sequence $\{\hat{I}_k\}$ may be correspondingly expressed by equation (6) as follows:

$$\hat{I}_k = \left[\sum_{n=-K}^{0} f_n \hat{y}_{k-n}\right] + \left[\sum_{n=1}^{L_1} b_n \tilde{I}_{k-n}\right]; \quad (6)$$

where n is the index variable, $L_1$ is a selectable parameter, and $f_n$ and $b_n$ are members of coefficients F and B, respectively, indexed by n. Parameters $L_o$ and $L_1$ are subject to certain constraints to preserve efficacy. Specifically, $L_o > K$ and $L_1 \geq K$. Consequently, $L_0$ may be set to K+1 and $L_1$ may be set to K without loss of generality to provide the preferred ranges for filter 70, filter 80, and feedback operator 90 as previously discussed. By making corresponding substitutions in equations (5) and (6), equalizer 54 may be described by equations (7) and (8) as follows:

$$\hat{y}_k = y_k - \left[\sum_{n=(K+1)}^{L} (c_n \tilde{I}_{k-n})\right]; \quad (7)$$

$$\hat{I}_k = \left[\sum_{n=-K}^{0} f_n \hat{y}_{k-n}\right] + \left[\sum_{n=1}^{K} b_n \tilde{I}_{k-n}\right]. \quad (8)$$

Preferably, K is selected to be in the range of 1 to 5 times $L_{pr}$ to assure adequate precursor reduction for changing channel responses.

Processor 68 provides coefficient sets F, B, and C to filter 70, filter 80, and feedback operator 90; respectively; as represented by corresponding signal paths 68a, 68b, and 68c. Processor 68 may be configured to determine an initial channel estimate corresponding to initial coefficient sets of F, B, and C. An initial channel estimate is preferably computed by processor 68 off-line using training data, a least squares procedure, a blind identification procedure, or such other technique as would occur to one skilled in the art for computing discrete coefficients. Once the initial channel estimate is determined, the corresponding filter is computed by processor 68 using least squares.

Further, processor 68 preferably is configured to adaptively update these coefficients as the channel response $\{c_n\}$ varies. Preferably, these updates occur at a sub-symbol rate. One form of adaptive updating may be performed by a stochastic gradient algorithm, also known as an LMS algorithm, which may be modeled as follows:

$$\hat{y}_{k+K} = y_{k+K} - \left[\sum_{n=(K+1)}^{L} (\check{c}_n(k) \tilde{I}_{k+K-n})\right]; \quad (9)$$

$$f_n(k+1) = f_n(k) + 2\mu_1 \hat{y}^*_{k-n} \epsilon_k \text{ for } n=0,\ldots,-K; \quad (10)$$

$$b_n(k+1) = b_n(k) + 2\mu_1 \tilde{I}^*_{k-n} \epsilon_k \text{ for } n=1,\ldots,K; \quad (11)$$

where n is an index variable, $\check{c}_n$ are the estimated channel coefficients C indexed to n; $f_n$ and $b_n$ are members of coefficients F and B, respectively, indexed by n; $\epsilon_k = \hat{I}_k - \tilde{I}_k$ is the decision error; and $\mu_1$ is a selectable step size. Thus, for a given set of $\check{c}_n$, equations (9)–(11) may be applied to determine coefficient sets F and B. Equations (12)–(14) are used to update the estimated channel coefficients as follows:

$$\check{y}_k = \sum_{n=0}^{L} \check{c}_n(k) \tilde{I}_{k-n}; \quad (12)$$

$$\gamma_k = y_k - \check{y}_k; \quad (13)$$

$$\check{c}_n(k+1) = \check{c}_n(k) + 2\mu_2 \tilde{I}_{k-n} \gamma_k \text{ for } n=0,\ldots,L; \quad (14)$$

Since $\check{y}_k$ uses $\tilde{I}_k$, the channel coefficient update to provide coefficient set C, which utilizes $\check{y}_k$, lags the filter update to provide coefficient sets B and F by K samples.

It has been found that for a sparse postcursor response of relatively long channel length compared to the precursor channel length ($L_{pr} \ll L_{po}$), that a portion of the multiplication operations of feedback filter 80 and feedback operator 90 may be eliminated without substantially impacting the reduction of the postcursor response. This reduction in complexity may be accomplished by applying a threshold test to each coefficient provided to feedback filter 80 and feedback operator 90. An alternative embodiment which includes threshold testing of the coefficients is expressed by equations (15) through (18) as follows:

$$\hat{y}_{k+K} = y_{k+K} - \left[\sum_{n \in C_m}^{L} (c_n \tilde{I}_{k+K-n})\right]; \quad (15)$$

$$\hat{I}_k = \left[\sum_{n=-K}^{0} f_n \hat{y}_{k-n}\right] + \left[\sum_{n \in B_m}^{K} b_n \tilde{I}_{k-n}\right]; \quad (16)$$

$$B_m = \{n : 1 \leq n \leq K, |b_n| > \eta_2\}; \quad (17)$$

$$C_m = \{n : K+1 \leq n \leq L, |c_n| > \eta_1\}; \quad (18)$$

where only those products ($c_n \tilde{I}_{k+K-n}$) of the summation of equation (15) that satisfy the condition $|c_n| > \eta_1$ are added together. The coefficients $c_n$ which satisfy $|c_n| > \eta_1$ are designated threshold coefficient set $C_m$. Notably the set $C_m$ is a subset of C. Also, for the second summation of equation (17), only the products ($b_n \tilde{I}_{k-n}$) which satisfy the condition $|b_n| > \eta_2$ are added together. The coefficients $b_n$ which satisfies $|b_n| > \eta_2$ are designated threshold coefficient set $B_m$. Notably $B_m$ is a subset of B. This reduction from the tentative coefficients of sets C and B to the coefficients of sets $C_m$ and $B_m$ identifies taps which only minimally contribute to equalization. As a result, these minimally contributing taps need not be weighted, making fewer multiplications necessary. Because such minimal contributions are dominant in sparse signals, a significant reduction in the number of multiplications typically result. It has been found that the ability to utilize sparseness of the channel response $c_n$ may be degraded by operation of the feedforward filter 70 such that $\{z_k\}$ may not be as sparse as input $\{\hat{y}_k\}$. Even under these circumstances, feedback operator 90 reduces postcursor interference by adjusting $\{y_k\}$ before sparseness may be diminished. One preferred way of determining the thresholds $\eta_1$ and $\eta_2$ is by determining the corresponding amount of mean squared error (MSE) introduced by deleting a corresponding single tap for filter 80 or feedback operator 90. If a tap corresponding to coefficient set C is deleted, the increase in MSE may be expressed by equations (19)–(21) as follows:

$$\sigma_I^2 |c_n|^2 \|f\|^2; \quad (19)$$

where:

$$\|f\|^2 = \sum_{n=-K}^{0} |f_n|^2; \text{ and} \quad (20)$$

$$\sigma_I^2 = \frac{1}{2} E\{|I_n|^2\} \quad (21)$$

is the variance for M-ary independent complex symbols of $\{I_n\}$. If a tap corresponding to coefficient set B is deleted, the MSE increases as expressed by equation (22) as follows:

$$\sigma_I^2 |b_n|^2. \quad (22)$$

Thus for these contributions to be equal then a threshold relationship may be established as a function of coefficient set F by equation (23) as follows:

$$\eta_2 = \eta_1 \|f\|. \quad (23)$$

Naturally, other techniques of selecting the threshold may be employed as would occur to one skilled in the art.

In an alternative embodiment, equalizer 54 may be modified to include threshold testing. The threshold test is preferably performed by processor 68. First, processor 68 determines the coefficient sets F, B, and C, utilizing, for example, the technique modeled by equations (9)–(14) or such other technique as would occur to those skilled in the art. The resulting sets C and B are tentative and provide the full range of coefficients needed to weight a tap for each of elements 93 and 83, respectively. The threshold test is conducted on the tentative coefficients of sets C and B by comparing each member to corresponding thresholds $\eta_2$ and $\eta_1$. Those members of C and B that meet the corresponding threshold become multiplier coefficient sets $C_m$ and $B_m$, respectively. Threshold testing is preferably performed by executing appropriate programming of processor 68.

For the tentative coefficients B that are not in $B_m$, the corresponding multipliers 84 are not needed and the respective taps 86 need not be summed by adder 88 or may otherwise input a zero (0) into adder 88. Likewise, multipliers 94 and taps 96 corresponding to tentative coefficients C that are not included in $C_m$ may be disregarded or provided as a zero input to adder 98. Consequently, multipliers 84 and 94 may potentially be fewer in number than elements 83 and 93, respectively.

For channel responses which do not require updating of the coefficients or thresholds, dedicated hardware that reflects removal of the multipliers corresponding to coefficients that do not meet the requisite threshold may be employed. In other embodiments, the reduction in multiplications afforded by threshold testing may facilitate the partial or total substitution of hardware multipliers with multiplications executed by a suitable processor appropriately interfaced to delay lines 82 and 92. In still other embodiments, only the coefficients associated with one delay line 82 or 92 may be tested by comparison to a threshold.

For sparse channel responses which are subject to response variation, it is preferred that the coefficient sets B, C, and F be updated by processor 68 on a periodic or demand basis and the threshold testing be correspondingly reapplied.

Figure 4:
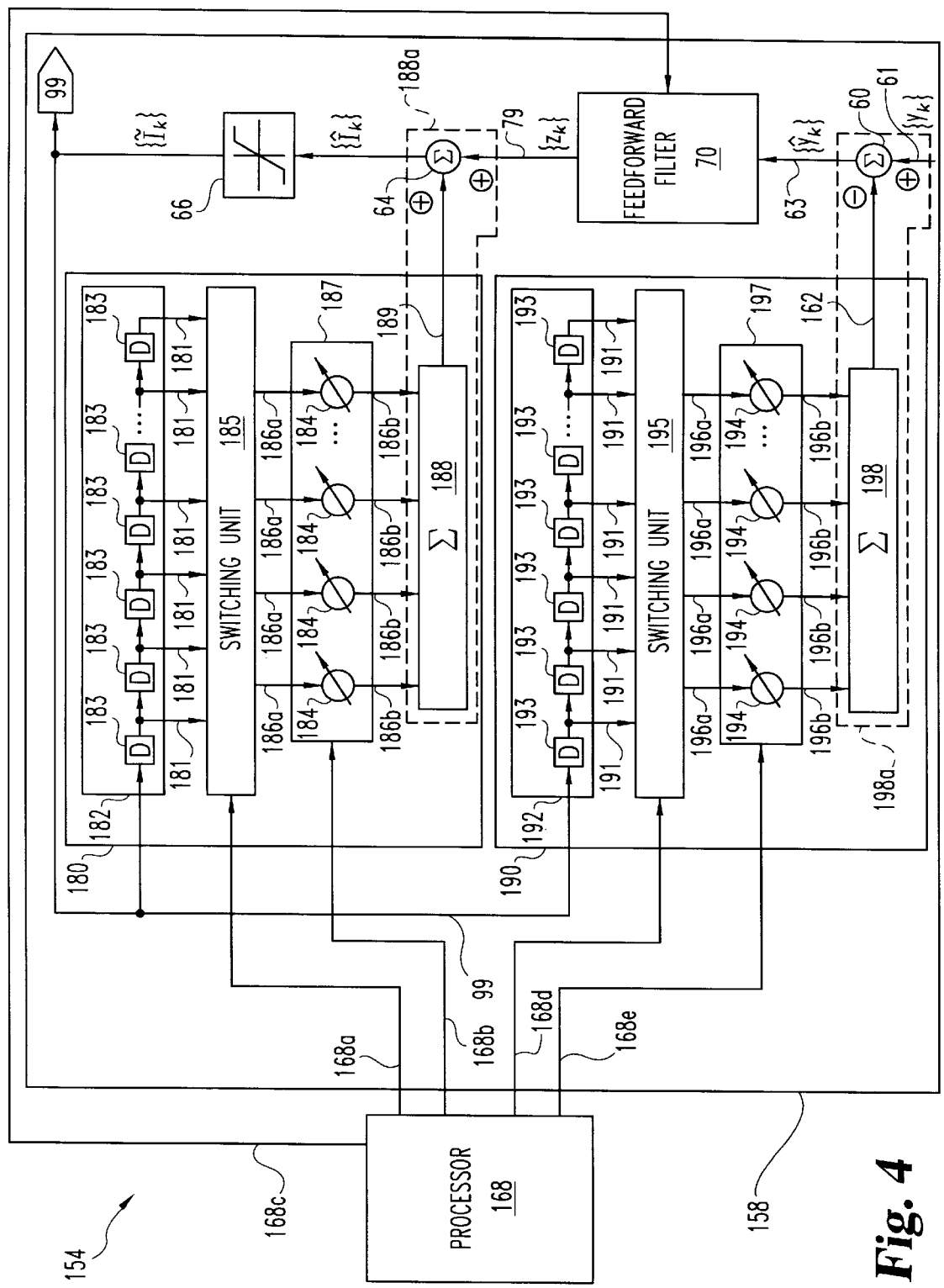
FIG. 4 is a schematic view of another equalizer of the present invention that may be interchanged with the equalizer shown in FIG. 1.

Moreover, a technique to reallocate multipliers on a periodic or demand basis would be advantageous to take further advantage of the signal sparseness. FIG. 4 depicts equalizer 154 of another embodiment of the present invention. Equalizer 154 may be interchanged with equalizer 54 of receiver 50 of system 20. The reference numerals of FIG. 4 which are identical to FIGS. 2 and 3 represent like features. Equalizer 154 includes hardware 158 under control of processor 168. Preferably, hardware 158 is a single-chip signal processing unit with corresponding operative connections to processor 168. In other embodiments, hardware 158 may be provided by multiple components using techniques known to those skilled in the art.

Processor 168 is programmed to control selected operations of hardware 158. Hardware 158 includes feedback filter 180 and feedback operator 190 which are each internally reconfigurable via switching units 185 and 195, respectively. Externally, feedback filter 180 and feedback operator 190 cooperate with adders 60 and 64, feedforward filter 70, and decision operator 66 in the same manner as feedback filter 80 and feedback operator 90 of equalizer 54.

Filter 180 includes delay line 182 with serially coupled delay elements 183 each providing a tap 181 into switching unit 185. Delay line 182 successively shifts input symbols $\tilde{I}_k$ at a symbol rate as described for the operation of delay line 82. Switching unit 185 includes taps 186a which are input into multiplier bank 187. Multiplier bank 187 includes an array of multipliers 184 which may be fewer in number than taps 181 and delay elements 183. Multipliers 184 are each configured to weight a corresponding tap 186a to provide a weighted output tap 186b to be summed with other outputs 186b by adder 188. Switching unit 185 is arranged to selectively route any tap 181 input to any tap 186a output in response to a control signal input along signal input 168a. However, it is preferred that only one tap 181 be routed to a given one of the multipliers 184 of bank 187. Accordingly, the allocation of multipliers 184 with respect to elements 183 may be controlled to change which taps 181 of delay line 182 are weighted and summed by adder 188. Moreover, the multipliers 184 may be reallocated as needed in response to a control signal along path 168a.

Feedback operator 190 includes delay line 192 with serially coupled delay elements 193 each providing a tap 191 into switching unit 195. Delay elements 193 of delay line 192 operate to successively shift received symbols $\tilde{I}_k$ from one element 193 to the next element 193 in a manner previously described for delay line 92. Switching unit 195 includes a corresponding number of taps 196a which are input into multiplier bank 197. Multiplier bank 197 includes an array of multipliers 194 which may be fewer in number than taps 191 or delay elements 193. Multipliers 194 are each configured to weight a corresponding tap input 196a to provide a weighted output tap 196b for summation by adder 198. Switching unit 195 is arranged to selectively route any tap 191 input to any tap 196a. However, it is preferred that only one tap 191 be routed to a given one of multipliers 194 of bank 197. Accordingly, the allocation of multipliers 194 with respect to elements 193 may be controlled to change which taps 191 of delay line 192 are weighted and summed by adder 198. Moreover, the multipliers 194 may be reallocated as needed in response to a control signal along path 168d.

A number of arrangements of switching units 185, 195 are envisioned. For example, switching unit 185 may be implemented as a solid state array of electronic switches equal in number to the quantity of tap outputs 186a, which is preferably the same as the number of multipliers 184 in bank 187. These switches each operate as a multiplexer having a number of inputs equal in quantity to taps 181 and one output. For each multiplexer-type switch, the inputs are each uniquely assigned to a different one of the tap 181 inputs and the corresponding single output uniquely provides one of the taps 186a. These switches each response to data along path 168a to provide the desired routing, and correspondingly allocate multipliers 184 as needed. Switching unit 195 may be analogously configured. In other embodiments, switching units 185 or 195 may be configured with one switch per tap output, but with fewer inputs corresponding to only selected ranges of taps 181 which may or may not overlap. Still other embodiments may provide switching units 185, 195 using techniques known to those skilled in the art.

Processor 168 is operatively coupled to switching unit 185 by path 168a to control operation thereof and multiplier bank 187 by signal path 168b to provide threshold coefficient set $B_m$. Processor 168 also is operatively coupled to switching unit 195 by path 168d to control operations thereof and multiplier bank 197 by signal path 168e to provide threshold coefficient set $C_m$. Furthermore, processor 168 is operatively coupled to filter 70 by signal path 168c to provide the coefficient set F.

Processor 168 is configured to: (a) establish the tentative coefficient sets B and C for equalizer 154 on a periodic or demand basis using techniques discussed in connection with equalizer 54; (b) compare each member of the sets B and C to the corresponding threshold to determine subsets $B_m$ and $C_m$; (c) generate one or more signals to control switching units 185,195 via paths 168a, 168d to thereby route each input tap 181, 191 to a different multiplier 184, 194 in correspondence with $B_m$, $C_m$; and (e) provide coefficients $B_m$ and $C_m$ to multiplier banks 187, 197 to correspondingly weight the allocated multipliers 184, 194. Processor 168 is also configured to calculate and supply the coefficient set F for filter 70, which may be determined as described in connection with equalizer 54.

Weighted output taps 186b, 196b are added by adders 188, 198, respectively, to correspondingly provide feedback to adders 64, 60 in the manner described in connection with equalizer 54. Adder 60 combines feedback from feedback operator 190 along path 162 with input data stream $\{y_k\}$ along path 61 to provide adjusted data stream $\{\hat{y}_k\}$ to feedforward filter 70 along path 63. Feedforward filter 70 reduces precursor intersymbol interference and provides a correspondingly adjusted output $\{z_k\}$ on path 79 to adder 64. Adder 64 sums $\{z_k\}$ with feedback on path 189 from filter 180 to provide data sequence $\{\hat{I}_k\}$. The $\{\hat{I}_k\}$ sequence is input into decision operator 66 to provide a corresponding decision symbol sequence $\{\tilde{I}_k\}$ in the manner described for equalizer 54. Each symbol $\tilde{I}_k$ is provided as an output on path 99 and fed back to filter 180 and operator 190.

Notably, adders 64, and 188 provide a common summing junction 188a represented by a single operator in phantom with inputs from taps 186b and path 79 (alternatively, the taps in filter 70 may be considered inputs). Also, adders 60 and 198 provide a common summing junction 198a represented by a single operator in phantom. For junction 198a, a signal input is provided by path 61 and other inputs are provided by taps 196b. Also, junction 98a includes an arithmetic sign changing capability for the tap 196b inputs relative to input 61; however, the arithmetic sign of taps 96 may be reversed before addition by summing junction 198a in the alternative. Accordingly, it should be appreciated that junctions 188a, and 198a may be implemented by one or more components, through programming, or a combination of these techniques as would occur to one skilled in the art.

Preferably, hardware 158 is a provided by a single integrated circuit. The ellipses in filter 180 and feedback operator 190 represent the addition of like structures coupled as discussed in connection with equalizer 54; however, in this case the number of multipliers 184, 194 is preferably less than the number of corresponding delay elements 183, 193.

Equalizer 154 provides an effective technique for removing postcursor intersymbol interference through filter 180 and feedback operator 190. Moreover, the ability to remove intersymbol interference by dynamically allocating hardware multipliers is realized. This approach is especially advantages for sparse postcursor responses.

Figure 5:
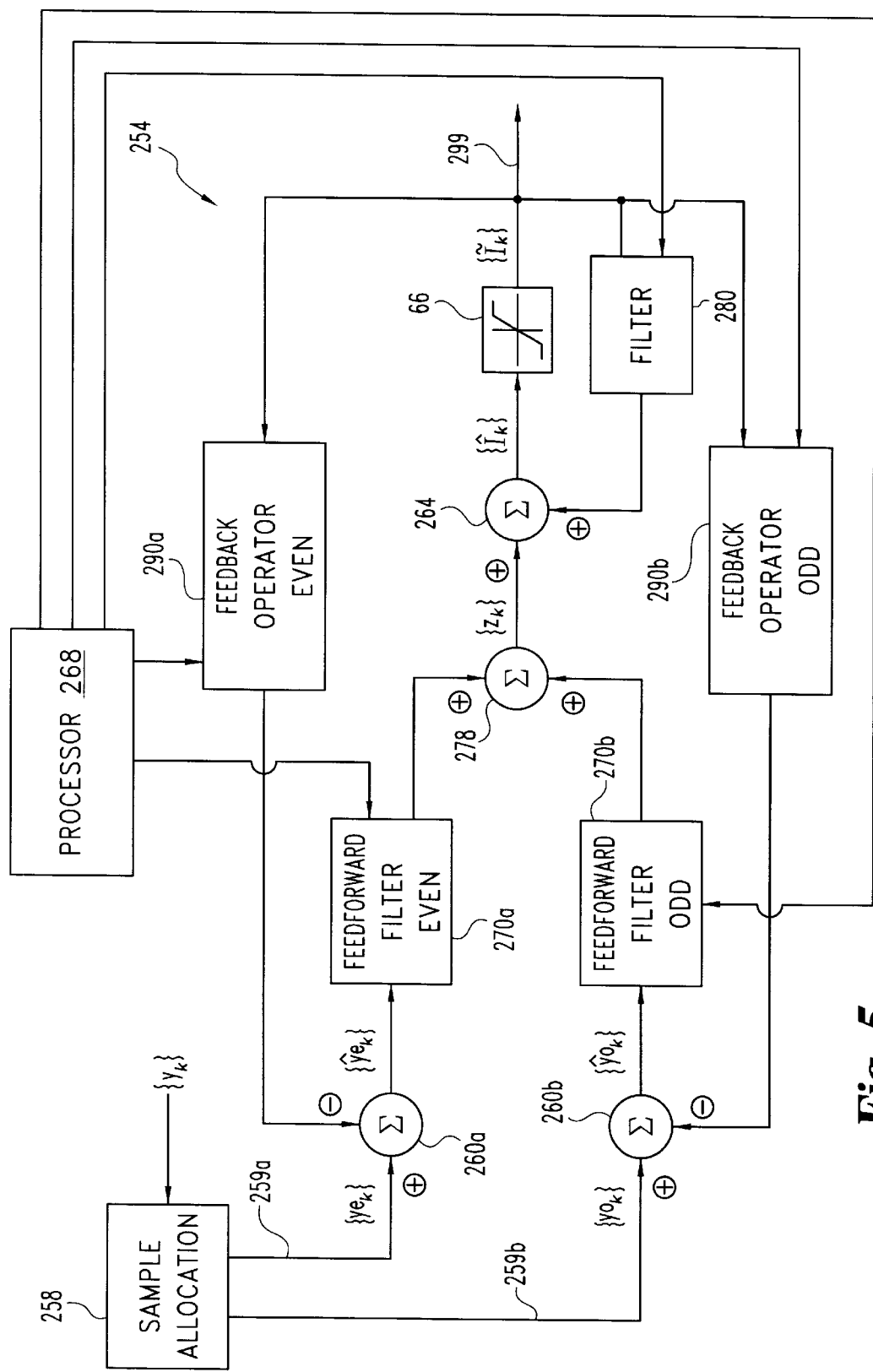
FIG. 5 is a schematic view of yet another equalizer of the present invention that may be interchanged with the equalizer shown in FIG. 1.

FIG. 5 depicts equalizer 254 of another alternative embodiment of the present invention. Equalizer 254 may be exchanged with equalizer 54 of system 20. FIG. 5 employs reference numerals common to FIGS. 2–3 which refer to like features. Equalizer 254 provides for fractionally-spaced operation by utilizing symbol-spaced units in parallel on allocated signal streams. For the depicted embodiment, $\lambda$ is set to 2 to result in an overall fractional spacing of $T/\lambda = T/2$ which corresponds to a processing rate twice the symbol rate. The data stream $\{y_k\}$ is input into symbol allocation unit 258 which provides even numbered samples of $\{y_k\}$ on signal path 259a as $\{ye_k\}$ and odd numbered samples on signal path 259b as $\{yo_k\}$. By providing these parallel data streams, the processing rate of each may still be the symbol rate, simplifying implementation of a fraction-spaced equalizer. Accordingly, the data streams $\{ye_k\}$ and $\{yo_k\}$ are each adjusted along paths 262a and 262b by adders 260a and 260b to provide data streams $\{\hat{y}e_k\}$ and $\{\hat{y}o_k\}$, respectively. Data streams $\{\hat{y}e_k\}$ and $\{\hat{y}o_k\}$ are each input into a corresponding feedforward filter 270a or 270b. Feedforward filters 270a, 270b each operate in a symbol-spaced manner. The outputs of feedforward filters 270a, 270b are reassembled at junction 278 to provide data stream $\{z_k\}$. The output data stream $\{z_k\}$ from junction 278 is adjusted with feedback from filter 280 by adder 264. Filter 280 may be either the filter 80 or 180 previously described, or such other feedback filter arrangement as would occur to one skilled in the art. The output of adder 264 is designated $\{\hat{I}_k\}$, and is sliced by decision operator 66 to provide $\{\tilde{I}_k\}$.

Each symbol $\tilde{I}_k$ is output on path 299 and fed back to filter 280, feedback operator 290a, and feedback operator 290b. Feedback operator 290a and feedback operator 290b provide feedback to the input data streams $\{ye_k\}$ and $\{yo_k\}$, respectively. Operators 290a, 290b each respectively receive only even or odd symbols from path 299. Operators 290a, 290b correspondingly process the respective even and odd feedback streams in a symbol-spaced manner; however, because this processing occurs in parallel in equalizer 254, fractionally spaced (T/2) performance relative to input data stream $\{y_k\}$ collectively results. Either feedback operator 90 or feedback operator 190 may be adapted with appropriate coefficient adjustments to provide operators 290a, 290b. Processor 268 is operatively coupled to feedforward filters 270a and 270b, feedback filter 280, feedback operator 290a, and feedback operator 290b to provide corresponding coefficients and other signals needed to operate the particular type of arrangement utilized. Moreover, threshold testing may be applied to filter 280, feedback operator 290a, or feedback operator 290b to reduce the number of multiplications and allocate hardware multipliers. For this embodiment, threshold testing accounts for the coefficients as applied to both feedback operator 290a and feedback operator 290b which is reflected in equations (24)–(27) as follows:

$$\hat{I}_k = \left[ \sum_{n=-K}^{0} f_{e,n} \hat{y}e_{k-n} \right] + \left[ \sum_{n=-K}^{0} f_{o,n} \hat{y}o_{k-n} \right] + \left[ \sum_{n \in BF_{tn}} b_n \tilde{I}_{k-n} \right]; \quad (24)$$

$$\hat{y}_{\bullet,k+K} = y_{\bullet,k+K} - \left[ \sum_{n \in CF_{tn}} (c_{\bullet,n} \tilde{I}_{k+K-n}) \right]; \quad (25)$$

$$CF_{tn} = \{n : K+1 \leq n \leq L, (|c_{e,n}| + |c_{o,n}|) > \eta_3\}; \quad (26)$$

$$BF_{tn} = \{n : 1 \leq n \leq K, |b_n| > \eta_4\}; \quad (27)$$

where "·" can represent either even and odd members. The threshold coefficients $BF_{tn}$ are those members of tentative coefficients B that satisfy the relation $|b_n| > \eta_4$. The coefficients $c_{e,n}$ and $c_{o,n}$ correspond to the tentative coefficients for feedback operator 290a and feedback operator 290b. For this embodiment, threshold coefficients $CF_{tn}$ correspond to those pairs of coefficients $c_{e,n}$ and $c_{o,n}$ that satisfy the condition $|c_{e,n}| + |c_{o,n}| > \eta_3$. Preferably, the number of multipliers utilized for feedback operators 290a, 290b is fewer than the number of delay elements for a channel with a sparse postcursor response. The coefficients for equalizer 254 may be calculated in a manner analogous to that described in connection with the equalizer 54 embodiment. It should be appreciated that different fractional spacing may be implemented corresponding to different values of λ as would occur to one skilled in the art. In one such embodiment, the fractional spacing is provided by adding additional parallel elements in the pattern established in connection with equalizer 254 of FIG. 5.

Figure 6:
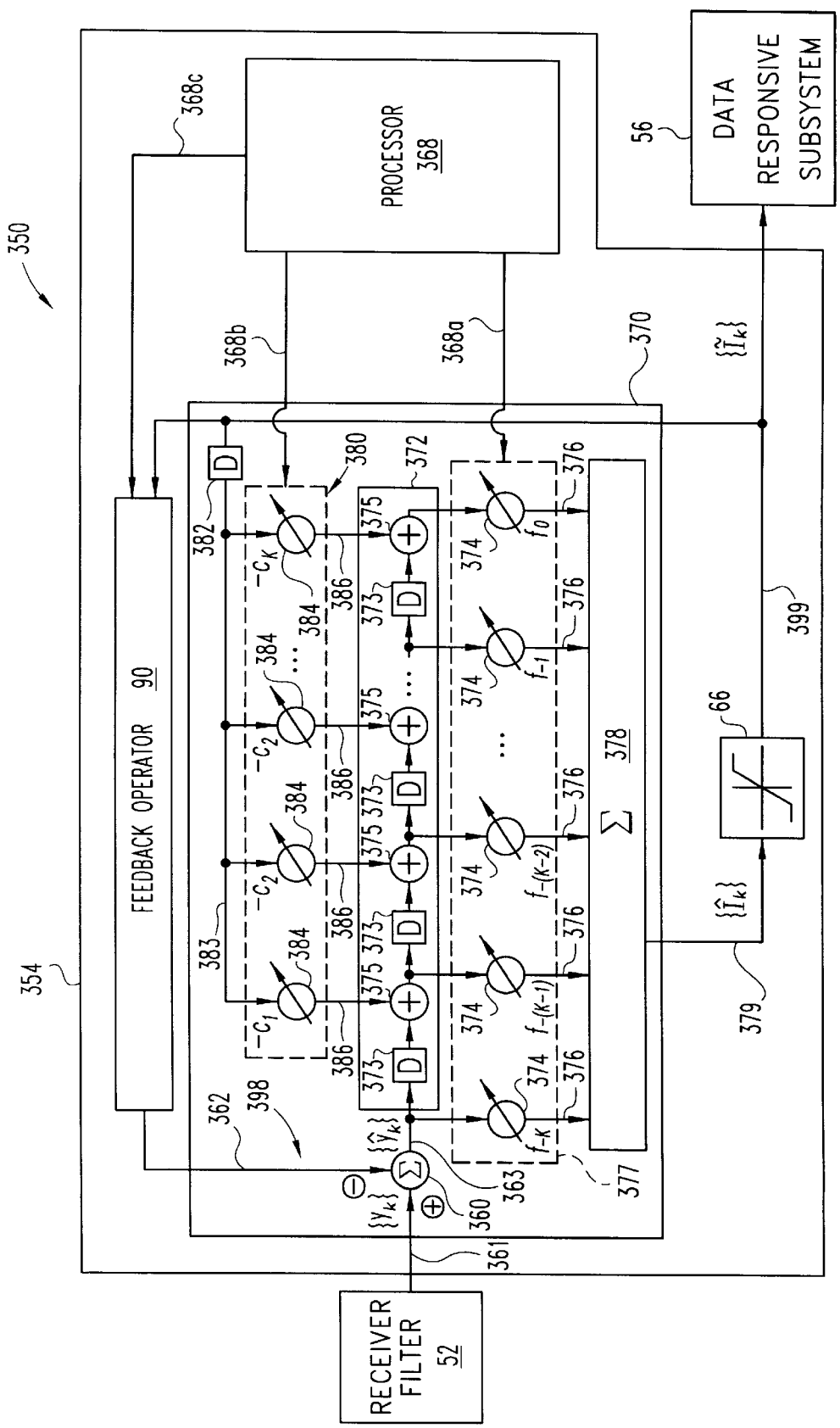
FIG. 6 is a schematic view of another receiver of the present invention that may be interchanged with the receiver shown in FIG. 1.

FIG. 6 depicts receiver 350 of another embodiment of the present invention. Receiver 350 may be exchanged with receiver 50 of system 20 depicted in FIG. 1. Reference numerals in FIG. 6 identical to those of other figures are intended to represent like features. Receiver 350 includes receiver filter 52 providing sample data stream $\{y_k\}$ to equalizer 354 to remove associated intersymbol interference. Equalizer 354 provides the equalized decision symbol sequence $\{\tilde{I}_k\}$ to data responsive subsystem 56.

Equalizer 354 receives $\{y_k\}$ as an input into adder 360. Adder 360 also receives feedback from feedback operator 90 on signal path 362 to provide $\{\hat{y}_k\}$ on signal path 363. Signal path 363 provides $\{\hat{y}_k\}$ to feedforward filter 370. Filter 370 includes delay line 372 comprised of pairs of serially connected delay elements 373 and summation elements 375. Each pair of elements 373, 375 also includes a tap multiplier 374 to provide a corresponding weighted tap 376. Data is clocked through delay line 372 at the symbol rate 1/T from one delay element 373 to the next as modified by operation of the intervening summation element 375. The output of each summation element 375 is also provided as the input to the corresponding tap multiplier 374. Coefficient set F, as previously described in connection with filter 70, is correspondingly input to multipliers 374 to provide weighted taps 376. Coefficient set F is provided by processor 368 along signal path 368a. Weighted taps 376 are summed by adder 378 to provide an output $\{\tilde{I}_k\}$ to decision operator 66 that operates as previously described in connection with the equalizer 54, 154, and 254 embodiments.

In response, decision operator 66 provides decision symbol stream $\{\tilde{I}_k\}$ on signal path 399 which is output to subsystem 56 and fed back into feedback network 380 of filter 370 and feedback operator 90. Feedback operator 90 operates in the same fashion as previously described for equalizer 54 with coefficients $c_{K+1}$ through $c_L$ being provided by processor 368 along signal path 368c.

Unlike previously described embodiments, equalizer 354 includes a feedback network 380 integral to feedforward filter 370 instead of a feedback filter. Network 380 includes delay element 382 and a number of input multipliers 384. Each symbol $\tilde{I}_k$ is fed back into network 380 of filter 370 via delay element 382. Delay element 382 provides a symbol-spaced delay output on signal path 383 to each of the input multipliers 384. Each input multiplier 384 provides a weighted output 386 to a different one of the summation elements 375 of delay line 372. Network 380 provides feedback to different points along delay line 372 via summation elements 375.

The weightings provided by input multipliers 384 correspond to coefficients $-c_1$ through $-c_k$ which are supplied by processor 368 along signal path 368b; where $c_1$ through $c_k$ are a subset of the channel response elements $\{c_n\}$. Collectively, feedback operator 90 and feedback network 380 incorporate coefficients $c_1, \ldots, c_k, C_{K+1}, \ldots,$ and $c_L$ ($c_1$ through $c_L$) of the FIR filter channel response model. It should also be appreciated that the contents of the feedback elements 373 of delay line 372 depend on the feedback provided by network 380 and feedback operator 90, such that these contents are determined as a function of $c_1$ through $c_L$. For Filter 370, the ellipses represent the option of one or more additional groups of multipliers 374, 384 and elements 373, 375 to provide further taps 376. Summing junction 398 corresponds to the collective summing node provided by adder 360 and the adder of operator 90 (not shown). Equalizer 354 may be expressed by equations (28) and (29):

$$\hat{I}_k = \left[ \sum_{n=-K}^{0} f_n \hat{y}_{k-n}^{(k)} \right]; \quad (28)$$

$$\hat{y}_k^{(l)} = y_k - \left[ \sum_{n=k-l+1}^{L} c_n \tilde{I}_{k-n} \right] \quad (29)$$

While the equalizer 54, 154, 254 embodiments remove postcursor intersymbol interference in a time invariant manner, the operation of equalizer 354 removes postcursor intersymbol interference from each sample $y_k$ in a time varying way.

Accordingly, the notation $\hat{y}_k^{(l)}$ denotes the residual obtained from $y_k$ by subtracting out all known postcursor intersymbol interference at a time (I). Assuming correct past decisions, the feedforward tap coefficient set F for filter 370 is the same as for filter 70.

The implementation of the delay lines of equalizer 354 may be expressed by equations (30) and (31) as follows:

$$\hat{y}_{k+K}^{(k)} = \hat{y}_{k+K} = y_{k+K} - \sum_{n=K+1}^{L} c_n \tilde{I}_{k+K-n}; \quad (30)$$

$$\hat{y}_{k+n}^{(k)} = D(\hat{y}_{k+n+1}^{(k-1)}) - c_{n+1} \tilde{I}_{K-1}, \quad n = 0, \ldots, K-1; \quad (31)$$

where D(.) denotes the delay operator such that:

$$D(\hat{y}_{k+n+1}^{(k-1)}) = \hat{y}_{k+n}^{(k-1)}. \quad (32)$$

As in the case of equalizer 54, for a known channel response $\{c_n\}$ of length L, equalizer 354 substantially reduces all intersymbol interference. In an alternative embodiment, equalizer 354 may be arranged for even/odd fractionally-spaced operation by providing a pair of feedback operators 90 and filters 370 which process even and odd numbered samples, respectively, as discussed in connection with equalizer 254. Furthermore, the present invention may be adapted to other fractional spacing using techniques known to those skilled in the art.

In still other embodiments, coefficients for equalizer 354 are threshold tested to take advantage of a long, sparse, postcursor channel response. Expressions which model this embodiment of the present invention are presented as equations (33)–(36):

$$\hat{y}_{k+K}^{(k)} = \hat{y}_{k+K} = y_{k+K} - \sum_{n \in CC_{tn}}^{L} c_n \tilde{I}_{k+K-n}; \quad (33)$$

$$\hat{y}_{k+n}^{(k)} = D(\hat{y}_{k+n+1}^{(k-1)}) - c_{n+1}\tilde{I}_{k-1}\delta_{tc}(n+1), \quad (34)$$
for $n = 0, \ldots, K-1$;

$$\tilde{I} = \left[\sum_{n=-K}^{0} f_n \hat{y}_{k-n}^{(k)}\right]; \quad (35)$$

$$CC_m = \{n : 1 \le n \le L, |c_n| > \eta_5\}; \quad (36)$$

where $D(.)$ is the delay operator described in connection with equations (32) and (33), $\delta_m(n+1)=1$ if $(n+1)$ belongs to the set $CC_m$ and is zero (0) otherwise. A single threshold $\eta_5$ may be applied to all coefficients $c_1$ through $c_L$ for both feedback operator 90 and filter 370.

Figure 7:
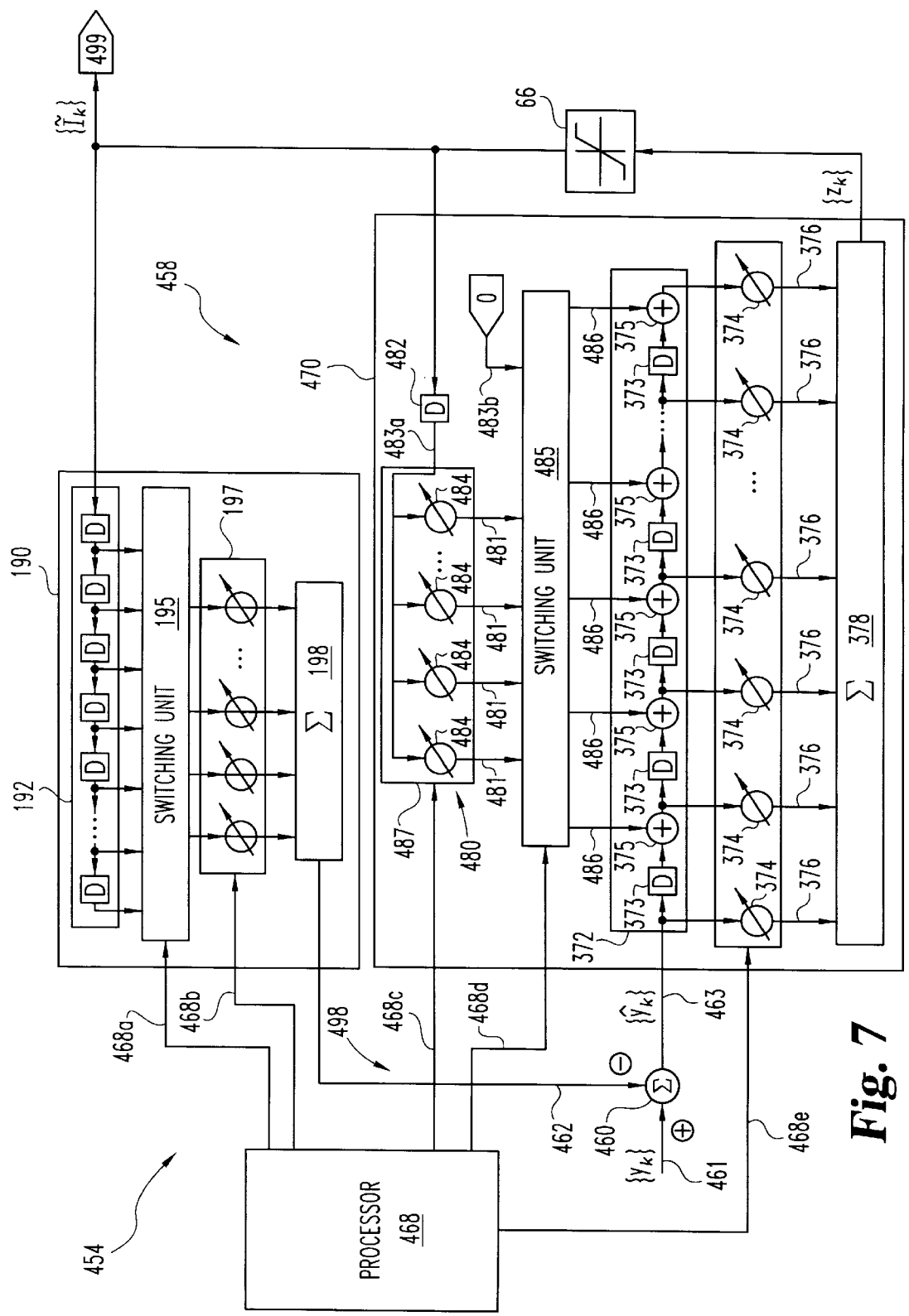
FIG. 7 is a still another equalizer of the present invention that may be interchanged with the equalizer shown in FIG. 1 or FIG. 6.

FIG. 7 provides equalizer 454 of another embodiment of the present invention that incorporates threshold testing of coefficients $c_1$ through $c_L$. Equalizer 454 may be exchanged with equalizer 354 of FIG. 6 or equalizer 54 of FIG. 1 of system 20. Reference numerals appearing in FIG. 7 which are identical to those in other figures are intended to represent like features. For equalizer 454, the input sample data stream $\{y_k\}$ on signal path 461 is combined with feedback on signal path 462 by adder 460. Accordingly, adder 460 outputs $\{\hat{y}_k\}$ on signal path 463 which is input into feedforward filter 470. Filter 470 includes delay line 372 and corresponding multipliers 374 to provide weighted taps 376 as previously described in connection with equalizer 354. Likewise, taps 376 are added by adder 378 to output $\{z_k\}$. Data stream $\{z_k\}$ is input into decision operator 66 which in turn outputs $\{\tilde{I}_k\}$ on signal path 499 for subsequent processing. Also, $\{\tilde{I}_k\}$ is fed back to feedback network 480 of filter 470 and feedback operator 190.

Feedback operator 190 operates as previously described for equalizer 154. Processor 468 provides signals along path 468a to control switching unit 195 and provides coefficients of set $CC_m$ in the range $c_{K+1}$ through $c_L$ to corresponding multipliers 194 of bank 197 along path 468b.

Feedback network 480 includes delay element 487, bank 487 of input multipliers 484, switching unit 485, and a selectable zero input 483b. Each symbol $\tilde{I}_k$ is input into network 480 via delay element 482. Delay element 482 provides a symbol-spaced delay and is provided on signal path 483a as an input to each multiplier 484 of bank 487. Input multipliers 484 also correspondingly receive negatively weighted coefficients from the range $c_1$ through $c_K$ contained in the set $CC_m$ along path 468c from processor 468. Each input multiplier 484 of bank 487 provides a weighted input 481 to switching unit 485. Switching unit 485 is responsive to control signals from processor 468 along signal path 468d to selectively route any of the inputs 481 or 483 to a corresponding selected one of the weighted outputs 486. Switching unit 485 may be configured in a manner analogous to switching units 185 or 195 as previously described.

In operation, processor 468 calculates and provides the F coefficient set to multipliers 374 along signal path 468e using techniques analogous to those discussed in connection with equalizer 54 or such other techniques as are known to those skilled in the art. Processor 468 also tentatively determines the channel response coefficients $c_1$ through $c_L$ and compares each to threshold $\eta_5$ to establish the corresponding subset, threshold coefficients $CC_m$ for weighting. Accordingly, processor 468 supplies each member of the set $CC_m$ of weighting coefficients in the range of $c_{K+1}$ through $c_L$ to multiplier bank 197. Only those members of range $c_K+1$ through $c_L$ that are in $CC_m$ are provided to adder 198. Adder 198 sums the inputs to provide feedback on signal path 462 to adder 460. Feedback on path 462 adjusts each sample $y_k$ to reduce postcursor intersymbol interference.

Processor 468 also provides members of $CC_m$ in the range of $c_1$ through $c_K$ to input multipliers 484 of bank 487 with a change of sign to provide weighted inputs 481. Processor 468 is configured to control routing of switching unit 485 to provide any of the weighted inputs 481 to a selected one of outputs 486 in accordance with membership in $CC_m$ for the tentative coefficient range $c_1$ through $c_K$. For those members of range $c_1$ through $c_K$ that do not pass the threshold test, the zero (0) input designated by reference numeral 483b is routed to the corresponding output(s) 486. As a result, the weighted decision symbol feedback is added into the delay line 372 at points corresponding to a weighting coefficient of set $CC_m$. The feedback provided by network 480 further reduces postcursor intersymbol interference.

As in the case of equalizer 354, equalizer 454 may be adapted for fractionally-spaced operation using techniques known to those skilled in the art. Preferably, operator 190 and filter 470 of equalizer 454 are comprised of reconfigurable hardware devices generally designated by the reference numeral 458. It should be appreciated that the multipliers in bank 197 and 487 may be significantly fewer in number than the taps of the corresponding delay lines 192 and 372, and still operate effectively for long, sparse postcursor channel responses. In this manner, the number of required multipliers may be reduced, providing for a more cost-effective and efficient allocation of hardware and processing resources as discussed in connection with the equalizer 54 and 154 embodiments. Summing junction 498 collectively represents the summing node provided by adder 198 and adder 460.

Processors 68, 168, 268, 368, and 468 may be provided by one or more electronic components, and may be comprised of analog circuitry, digital circuitry, or a combination of both. Preferably processors 68, 168, 268, 368 and 468 are programmable devices; however, selected operations regarding the determination of coefficients may be embodied in dedicated hardware to more effectively meet speed or efficiency goals.

Further techniques for optimizing coefficient values for a given criteria are also contemplated as would occur to those skilled in the art. The various elements, delay lines, taps, multipliers, networks, filters, operators, units, paths, adders, and summing junctions of the present invention as depicted in FIGS. 1–7 may be embodied in software, firmware, hardware, or a combination of these approaches as would occur to those skilled in the art, and are not intended to limit the present invention to the depicted arrangement. For high-speed operations, it is preferred that these devices be embodied in dedicated signal processing circuits with appropriate aspects of control and coefficient calculations being performed by a programmable processor operatively coupled thereto. Multipliers 74, 84, 94, 184, 194, 374, 384, or 484 may be real number multipliers, complex number multipliers or such other multiplier arrangement suitable to provide weighting appropriate for the format of the signal being processed.

It is contemplated that various processes performed by equalizers 54, 154, 254, 354, or 454 may be altered, rearranged, substituted, deleted, duplicated, combined, or added to other processes using techniques known to those skilled in the art. It is also contemplated that various features of the equalizer embodiments 54, 154, 254, 354, 454 may be altered, rearranged, substituted, deleted, duplicated, combined, or added to other features as would occur to one skilled in the art without departing from the spirit of the present invention.

As used herein, it should be appreciated that: "variable," "criterion or criteria," "characteristic," "standard," "quantity", "amount," "constant," "data," "input," "output," "threshold," "command," "coefficient," "sequence," "stream," or "symbol," each generally correspond to one or more signals within the equalizers of the present invention.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method, comprising:

receiving a signal with intersymbol interference;

filtering a data stream corresponding to the signal with a first filter to reduce intersymbol interference;

slicing a data sequence corresponding to the data stream after said filtering to provide a corresponding stream of symbols, the symbols each being selected from a predetermined symbol set;

successively shifting each of the symbols through a first number of delay elements; and further reducing the intersymbol interference by adjusting the data stream input into the first filter with feedback from a first plurality of taps of the first delay elements.

2. The method of claim 1, further comprising determining a number of tap coefficients that meet a predetermined threshold and weighting the first taps with the tap coefficients, wherein the first taps are fewer in number than the first delay elements.

3. The method of claim 2, wherein said determining is performed with a processor and said weighting includes allocating each of the first taps to a different one of the first delay elements with a switching unit controlled by said processor.

4. The method of claim 1, further comprising summing the first taps to provide the feedback.

5. The method of claim 1, further comprising:

sending the stream of symbols through a second filter; and combining an output of the first filter with an output of the second filter to provide the data sequence.

6. The method of claim 5, wherein the second filter includes a second number of delay elements and a second plurality of taps, and further comprising:

establishing a first threshold and a second threshold;

determining a number of first tap coefficients that each meet the first threshold and a number of second tap coefficients that each meet the second threshold; and correspondingly weighting each of the first taps with the first tap coefficients and the second taps with the second tap coefficients.

7. The method of claim 6, further comprising allocating each of the first taps to a different one of the first delay elements with a switching unit.

8. The method of claim 6, wherein the first and second thresholds are established as a function of a number of filtering coefficients determined for the first filter.

9. The method of claim 1, further comprising:

determining a number of tentative coefficients;

comparing each of the tentative coefficients to a predetermined threshold to select a set of feedback coefficients as a subset of the tentative coefficients;

providing a first number of the feedback coefficients to a corresponding number of input multipliers for the first filter;

providing a second number of the feedback coefficients to correspondingly weight the first taps.

10. An apparatus for processing a data signal with intersymbol interference, comprising:

a first summing junction to provide a first reduction of the intersymbol interference by adjusting the data signal with a feedback signal;

a first feedforward filter responsive to the data signal after the first reduction to provide a second reduction of the intersymbol interference;

a decision operator responsive to the data signal after the first and second reductions to provide a corresponding stream of symbols, the symbols each being selected from a predetermined symbol set; and a first feedback delay line with a first number of delay elements and a first plurality of weighted taps, said first feedback delay line being responsive to the stream of symbols to successively shift each of the symbols through the first delay elements and provide the feedback signal to said first summing junction as a function of said first weighted taps.

11. The apparatus of claim 10, further comprising a second feedback delay line with a second number of delay elements and a second plurality of weighted taps, said second feedback delay line being configured to successively shift the stream of symbols through said second delay elements, and wherein an output of said first feedforward filter and said second weighted taps are combined to provide an input to said decision operator.

12. The apparatus of claim 11, further comprising a processor configured to provide:

a first set of tentative feedback coefficients;

a first set of multiplier coefficients selected as a subset of the first set of tentative coefficients by comparing each of the first set of tentative coefficients to a first predetermined threshold;

a second set of tentative coefficients;

a second set of multiplier coefficients selected as a subset of the second set of tentative coefficients by comparing each of the second set of tentative coefficients to a second predetermined threshold;

wherein the first set of multiplier coefficients are provided to correspondingly weight said first weighted taps and the second set of multiplier coefficients are provided to correspondingly weight said second weighted taps.

13. The apparatus of claim 12, wherein said processor is configured to provide a set of feedforward coefficients for said first feedforward filter and determine the first and second thresholds as a function of the feedforward coefficients.

14. The apparatus of claim 10, wherein said first feedforward filter includes a second number of delay elements, a second number of weighted taps each having a corresponding tap multiplier, a multiplicity of summation elements in one-to-one correspondence with said second delay elements, a plurality of input multipliers each corresponding to a different one of said second delay elements, and an adder.

15. The apparatus of claim 14, further comprising a processor configured to provide:
   a set of tentative coefficients;
   a set of multiplier coefficients selected as a subset of the set of tentative coefficients by comparing each of the set of tentative coefficients to a predetermined threshold;
   wherein a first number of the set of multiplier coefficients are provided to correspondingly weight said first weighted taps and a second number of the set of multiplier coefficients are correspondingly provided to said input multipliers.

16. The apparatus of claim 10, wherein said first weighted taps are fewer in number than said first delay elements and further comprising a switching unit to selectively allocate each of the first weighted taps to a different corresponding one of said first delay elements.

17. The apparatus of claim 10, wherein the data signal corresponds to even numbered samples of an input signal, and further comprising a second summing junction, a second feedforward filter, and a second delay line to process odd numbered values of the input signal.

18. A method comprising:
   determining a first set of coefficients for an equalizer receiving a signal with intersymbol interference;
   comparing each of the first coefficients to a predetermined threshold to select a second set of threshold coefficients, the second coefficients being a subset of the first coefficients; and
   equalizing the signal with the equalizer as a function of the second coefficients to reduce the intersymbol interference and minimize multiplication operations for said equalizing.

19. The method of claim 18, further comprising repeating said determining and said comparing to update the second coefficients for a change in response of a channel providing the signal.

20. The method of claim 18, wherein:
   the equalizer has a number of delay elements and a number of multipliers;
   the first coefficients have a one-to-one correspondence with the delay elements; and
   the second coefficients each correspond to a different one of the multipliers and a different one of the delay elements, the different one of the delay elements being determined in accordance with the one-to-one correspondence of the first coefficients selected to provide the second coefficients.

21. The method of claim 18, further comprising:
   providing a number of delay elements and a number of multipliers to perform at least a portion of said equalizing;
   allocating each of the multipliers to a selected one of the delay elements in accordance with the second coefficients to optimize said equalizing for sparseness of a postcursor portion of the intersymbol interference.

22. The method of claim 21, wherein aid determining, said comparing, and said allocating are performed in accordance with programming of a processor.

23. The method of claim 21, further comprising:
   determining a third set of coefficients after a period of time;
   comparing each of the third coefficients to the first threshold to provide a fourth set of coefficients, the fourth coefficients being a subset of the third coefficients; and
   reallocating the multipliers in accordance with the fourth set of coefficients.

24. The method of claim 23, wherein the equalizer includes a switching unit controlled by a processor to perform said allocating and said reallocating.

25. The method of claim 18, wherein said equalizing includes:
   successively shifting a data stream corresponding to the signal through a feedforward filter having a corresponding number of feedforward taps;
   successively shifting a stream of decision symbols corresponding to the signal through a first delay line having a first number of delay elements and a first plurality of feedback taps, the first feedback taps each being weighted by one of the second coefficients; and
   adjusting data entering the feedforward filter with a sum of the first feedback taps.

26. The method of claim 25, wherein said equalizing includes:
   determining a third set of coefficients;
   comparing each of the third coefficients to a second threshold to provide a fourth set of coefficients, the fourth coefficients being a subset of the third coefficients;
   successively shifting the stream of decision symbols through a second feedback filter having a second number of delay elements and a second number of feedback taps;
   weighting the second feedback taps each with a corresponding one of the fourth coefficients; and
   adding together the feedforward taps and the second feedback taps to provide an input to a decision operator generating the stream of decision symbols.

27. The method of claim 25, wherein the feedforward filter includes a second delay line with a second number of delay elements each corresponding to one of the feedforward taps, a plurality of input multipliers each providing a product of one of the decision symbols and a corresponding one of the second coefficients, and further comprising:
   feeding back each of the products of the multipliers to a different point along the delay line; and
   slicing a summation of the feedforward taps to provide the stream of decision symbols.

28. A method of processing a signal with intersymbol interference, comprising:
   successively shifting a data stream corresponding to the signal through a feedforward filter to reduce at least a precursor portion of the intersymbol interference;
   successively shifting a stream of decision symbols corresponding to the signal through a first delay line to provide feedback, the first delay line having a first number of delay elements and a first plurality of taps; and adjusting data entering the feedforward filter with a sum of the first taps to reduce a postcursor portion of the intersymbol interference.

29. The method of claim 28, further comprising:

successively shifting the stream of decision symbols through a second delay line for providing feedback, the second delay line having a second number of delay elements and a second number of taps; and summing together a number of feedforward taps from the feedforward filter and the second taps to provide an input to a decision operator generating the stream of decision symbols.

30. The method of claim 28, further comprising:

determining a first set of coefficients;

comparing each of the first coefficients to a first predetermined threshold to select a second set of coefficients, the second coefficients being a subset of the first coefficients; and weighting each of the first taps with a corresponding one of the second coefficients.

31. The method of claim 30, wherein the feedforward filter includes a number of feedforward taps, a second number of delay elements each corresponding to one of the feedforward taps and a plurality of input multipliers to introduce feedback between said second delay elements, said input multipliers each providing a product of one of the decision symbols and a corresponding one of the second coefficients.

32. The method of claim 30, further comprising:

determining a third set of coefficients;

comparing each of the third coefficients to a second predetermined threshold to select a fourth set of coefficients, the fourth coefficients being a subset of the third coefficients;

successively shifting the stream of decision symbols through a second delay line having a second number of delay elements and a second plurality of taps; and weighting each of the second taps with a corresponding one of the fourth coefficients; and adding together a number of feedforward taps from the feedforward filter and the second taps to provide an input to a decision operator generating the stream of decision symbols.

33. The method of claim 30, wherein the first taps are fewer in number than the first delay elements and further comprising allocating each of the first taps to a different one of the first delay elements with a switching unit.

34. The method of claim 33, wherein a processor performs said determining, said comparing, said weighting, and said allocating; and further comprising:

repeating said determining, said comparing, said weighting, and said allocating to update weights of the first feedback taps to accommodate changes in response of a channel providing the signal.

35. An apparatus for reducing intersymbol interference of a signal, comprising:

a first filter with a first number of delay elements each having a corresponding one of a first number of weighted taps configured to reduce the intersymbol interference when the signal is fed therethrough;

a decision operator to provide a number of decision symbols from a predetermined symbol alphabet corresponding to the signal received from said first filter; and a feedback means for further reducing the intersymbol interference with a number feedback coefficients, said feedback coefficients being selected as a subset of a number of tentative coefficients by comparing each of the tentative coefficients to a predetermined threshold;

wherein at least one input to said first delay elements of said first filter is determined as a function of the feedback coefficients.

36. The apparatus of claim 35, wherein said feedback means includes:

a second number of delay elements to successively shift the decision symbols from said decision operator therethrough and a second number of weighted taps allocated to said second delay elements, said second weighted taps being summed together to provide a feedback adjusted input to said first filter; and a second filter with a third number of delay elements to successively shift the decision symbols from said decision operator therethrough and a third number of weighted taps allocated to said third delay elements, said third weighted taps being summed with an output of said first filter to provide an input to said decision operator.

37. The apparatus of claim 35, wherein each of said first weighted taps is provided by a corresponding one of a number of tap multipliers, and said feedback means includes a plurality of input multipliers fewer in number than said tap multipliers, said input multipliers each being configured to provide a product of a decision symbol from said decision operator and a corresponding one of the feedback coefficients.

* * * * *